Jan. 26, 1965 J. A. D'AQUILA 3,167,757

CONVERTER

Filed Oct. 24, 1960 4 Sheets-Sheet 1

Inventor
Joseph A. D'Aquila,

By Paris, Haskell and Levine ATTORNEYS

INVENTOR
Joseph A. D'Aquila,
BY Paris, Haskell and Levine
ATTORNEYS

INVENTOR
Joseph A. D'Aquila,
BY Paris, Haskell and Levine
ATTORNEYS

Jan. 26, 1965 J. A. D'AQUILA 3,167,757

CONVERTER

Filed Oct. 24, 1960 4 Sheets-Sheet 4

INVENTOR

Joseph A. D'Aquila,

BY Paris, Haskell and Levine

ATTORNEYS

United States Patent Office 3,167,757
Patented Jan. 26, 1965

3,167,757
CONVERTER

Joseph A. D'Aquila, Oreland, Pa., assignor, by mesne assignments, to United Aircraft Corporation, a corporation of Delaware Filed Oct. 24, 1960, Ser. No. 64,465
7 Claims. (Cl. 340—347)

Figure 1:
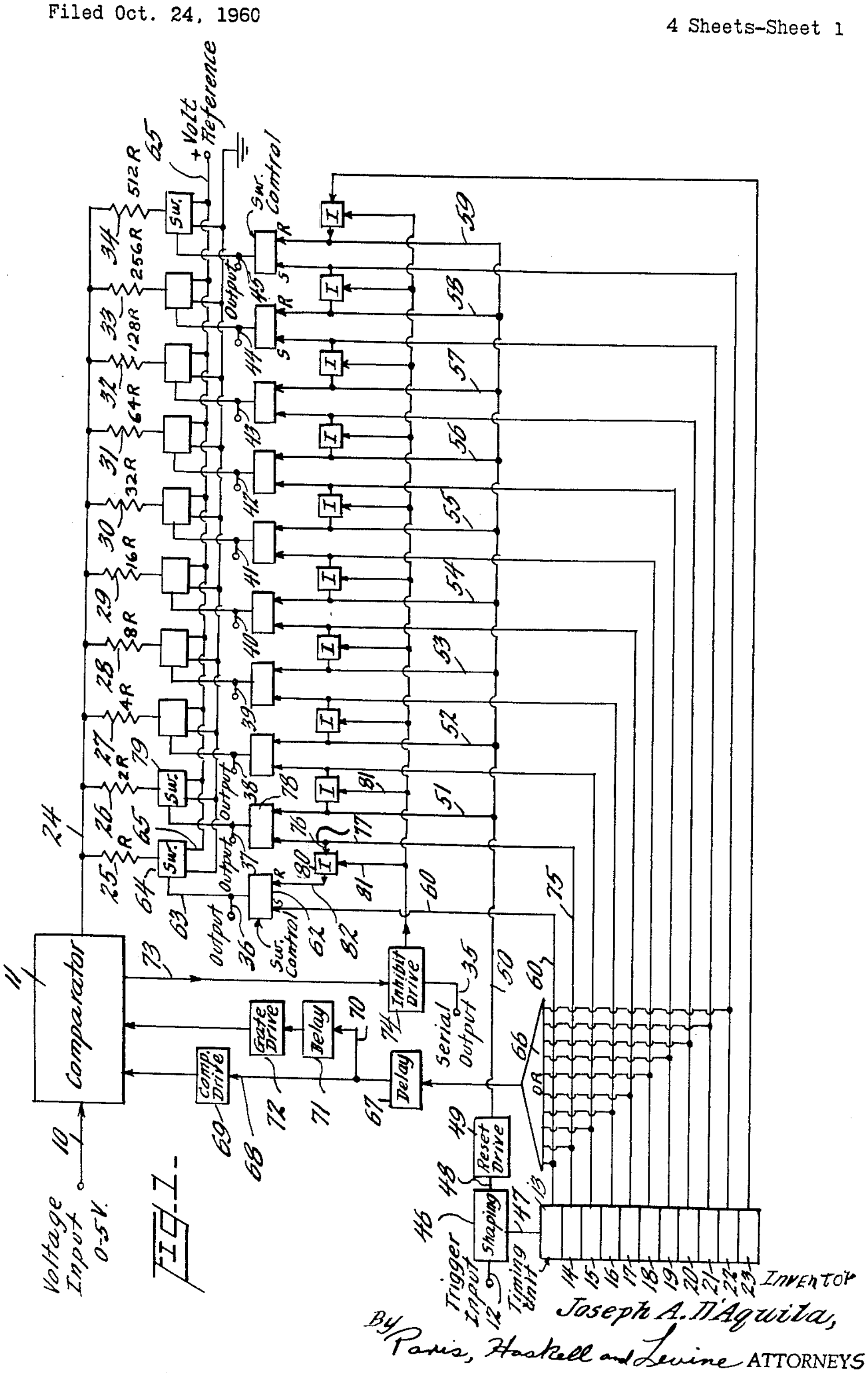

This invention generally relates to analog to digital converters of the electronic variety wherein a variable voltage or current intelligence signal is rapidly and accurately converted into a series of electrical impulses spaced in time or in position according to the analog intelligence signal, which pulses represent the signal in either the binary or other digital numbers system.

The invention is particularly concerned with providing a miniaturized electronic converter system of this type employing a minimum number of solid state and magnetic components, that may rapidly and accurately perform the function desired yet be lightweight and occupy a minimum of space as well as being relatively insensitive to variations in temperature, pressure, and vibration; and being unaffected by adverse humidity, acceleration, and shock conditions. Requirements of this type are presently imposed in telemetric systems for communication between aircraft, missiles and like vehicles and between aircraft and ground stations, where the environment may change rather rapidly.

To perform this conversion function according to the invention, the intelligence signal is successively compared with a plurality of different signal levels, each incrementally increasing by a different order or digital place of the number in the binary or other radix system selected. After each comparison, the added increment or order of the binary number is either retained or rejected depending upon whether it is contained in the intelligence signal. Consequently after the series of comparisons have been completed, the various orders of the number that are retained correspond in digital form to the converted analog signal whereby the digital number may be read out either sequentially during the comparison steps or simultaneously, after all of the comparison steps have been completed. Thus, the present invention reproduces the analog intelligence signal in digital form by synthesizing a series of closely approaching approximations and comparing each approximation with the intelligence signal until the final approximation exactly or closely corresponds to the analog signal. By providing a sufficient number of approximations in a suitable radix system, such as in the binary system, the analog intelligence signal may be converted into digital form with a high degree of accuracy, as is desired.

It is accordingly a principal object of the invention to provide a rapid and accurate analog to digital converter.

Another object is to provide such a converter that is comprised exclusively of solid state components that are of light weight and small size, and wherein the system possesses a minimum number of such components.

Still another object is to provide such a system that is particularly well adapted for telemetric applications.

Other objects and many additional advantages will be more readily understood by those skilled in the art after a consideration of the following specification taken with the accompanying drawings wherein:

FIG. 1 is an electrical block diagram representation of a preferred embodiment of the invention and illustrating the various circuits employed in a functional manner, and;

FIGS. 2 to 9, inclusive are electrical schematic illustrations of preferred embodiments of the various circuits employed in the system of FIG. 1.

It is first believed helpful in view of the relatively large number of circuits involved, to briefly outline the overall functioning of the system without reference to each individual circui tand thereafter to consider the detailed system operation and function together with preferred circuits for performing the various functions. Referring to FIG. 1, the analog signal to be converted into digital form is initially introduced into the system over line 10 leading to a comparator circuit 11 and thereafter a triggering start impulse is applied at terminal 12 and thence directed to the first unit 13 of an automatic timing circuit comprised of units 13 to 23, inclusive, which units thereafter operate in timed sequence to initiate each successive function of the system. As disclosed, the system is adapted to convert the analog input signal on line 10 into a ten-place or ten order binary number, although it will be apparent as the description proceeds that the invention is not limited to conversion in the binary number system nor to any particular number of digits or orders, since a greater or lesser number of digits may be employed depending upon the accuracy desired.

Returning to FIG. 1, the triggering of the first timing unit 13 functions to initiate a first predetermined voltage level on line 24 leading to the comparator 11 and being produced by energizing a resistor 25. This first timing pulse also initiates the comparator 11 to compare the analog input signal on line 10 with this first voltage level on line 24. The voltage level on line 24 corresponds to the highest order of the binary number to be determined and consequently if this voltage level exceeds that of the analog input voltage on line 10, it is known that the highest order of the binary number is not contained in the input signal and the first digit of the binary number to be found is accordingly 0. On the other hand, if the input voltage on line 10 exceeds this first level of voltage on line 24, it is known that the highest digit is contained in the analog signal, and the highest digit of the converted number to be found is 1. After this first comparison or approximation is made, the second timing unit 14 is automatically operated, and a second resistor 26 is energized to supply an increment of voltage on line 24 corresponding to the next lower order of the binary number to be found. Assuming that the highest order of the binary number is contained in the input signal, as discussed above, both resistors 25 and 26 are energized and the voltage increment supplied by the energized resistor 26 is added to the voltage level previously provided by energized resistor 25. On the other hand, if the highest order of the binary number is not contained in the input signal, the resistor 25 is de-energized and only the resistor 26 is energized to produce a resulting voltage level on line 24 corresponding only to the second highest order of the binary number to be found.

Thereafter, a second comparison is made between the voltage level on line 24 and the input signal on line 10 in the comparator 11 to determine if the second highest order of the binary number is contained in the input signal and if so, the second digit of the binary number to be found is 1; and if not, the second highest digit of the binary number to be found is 0.

In the same manner as discussed, each succeeding one of the timing units 15 to 23, inclusive, is energized to successively add increments of voltage to line 24 through different ones of resistors 27 to 34, inclusive, with each voltage increment corresponding to the next lower order of the binary number to be found. After each such voltage increment is added to line 24, a comparison is made in the comparator circuit 11, and that voltage increment is either retained on line 24 or removed from line 24, after each comparison, depending upon whether or not the voltage on line 24 exceeds that of the input voltage 10 or is less than the input voltage 10. Finally, when all of the comparisons have been made as described above, the voltage on line 24 substantially equals the input voltage on line 10 and the conversion operation is completed.

The system of the present invention lends itself to either a sequential or a simultaneous read-out of the digital number. For a sequential or serial read-out, it is merely necessary to note after each comparison step whether or not that order of the binary number is contained in the input, and this information is readily available at the output terminal 35 leading from the comparator circuit 11. For simultaneous read-out, on the other hand, an output line 36 to 45, respectively, is provided in circuit with each of the resistors 25 to 34, inclusive, and the voltage on each such output line indicates whether or not that resistor is energized or de-energized after completion of the comparison step. Consequently after the completion of the comparison steps the signals on output lines 36 to 45 represents the binary equivalent number of the analog input voltage signal 10, and these output lines may be simultaneously scanned to read out the binary number desired.

Returning to FIG. 1 for a more detailed consideration of the individual circuits and their mode of operation according to the invention, the triggering input or start pulse received on line 12 is initially applied to a wave shaping circuit 46, and after wave shaping, the pulse is directed downwardly over line 47 to the first unit 13 of the timing control. This pulse is also directed over line 48 to a reset drive circuit 49, and a reset pulse is developed over line 50 and transmitted upwardly over each of lines 51 to 59, inclusive, that lead to all orders of the voltage level increment-producing circuits except for the highest order, as will be discussed in more detail below. The reset drive pulse over line 50 operates to remove all of the voltage level increments from line 24 excepting for the increment from the highest order through resistor 25 thereby to reset the system in preparation for a new analog-to-digital conversion.

The first timing unit 13, simultaneously with the reset drive pulse over line 50 produces an impule over line 60 and upwardly to operate a switch control unit 62. Operation of the switch control unit 62, in turn, produces a signal upwardly over line 63 to close a switch unit 64 that serves to apply a reference voltage on line 65 to the lower terminal of resistance 25, thereby energizing the comparator line 24 in proportion to the resistance value of resistor 25. In other words, the first timing unit 13 produces an impulse over line 60, which, in turn, serves to apply a reference voltage from voltage source 65 to the lower terminal of a resistor 25 whereby the comparator line 24 is energized by a potential proportional to the value of resistor 25.

In addition to the above, the timing unit 13 also produces an impulse travelling upward over line 61 and through an "or" circuit 66 to a time delay circuit 67. Consequently, as thus far described, the introduction of the triggering start impulse over line 12 serves to reset the system and simultaneously functions to apply a first voltage level to the comparator line 24 that is proportional to the highest order of the binary number to be determined.

After the time delay imposed by the delay circuit 67, an impulse is directed upwardly over line 68 to the comparator drive circuit 69 and thence to the comparator circuit 11, and is also directed upwardly over line 70 and through a second time delay circuit 71 and gate drive circuit 72 to the comparator 11. In the first mentioned path, the comparator drive circuit 69 energizes the comparator 11 in such manner as to condition the comparator 11 for making a comparison between the input signal on line 10 and the first voltage level on line 24. After the comparator has been thus conditioned, the delayed pulse from time delay circuit 71 is directed upwardly through the gate circuit 72 to trigger the comparator circuit into operation.

As generally mentioned above, the comparator circuit thereafter compares the voltage input on line 10 with the voltage level then appearing on line 24, and it produces an output impulse over line 73 and to an inhibit drive circuit 74 in the event that the voltage level on line 24 is less than the voltage of the input on line 10. On the other hand, if the first voltage level on line 24 exceeds the voltage on the input line 10, no pulse is generated over the comparator output line 73 to the inhibit circuit.

After the completion of this first comparison step, the timing unit 13 then triggers the next succeeding timing unit 14 into operation and a pulse is produced by the second timing unit 14 over lines 75 and 77 to energize the second switch control unit 78, thereby closing the second main switch 79 and applying the reference voltage source on line 65 to energize the second resistor 26 and apply an added voltage increment to the comparator line 24. Additionally, this timing impulse on line 75 is also directed over line 76 and to a gate 80. The function of the gate 80 is to enable resetting of the switch control 62 in response to the impulse from the second timing unit 14 in the event that the previous comparison has shown that the voltage level on line 24 exceeded the input signal on line 10.

As will be recalled, the inhibit drive 74 produces a pulse only if the input voltage on line 10 exceeds the previous voltage level on line 24, and this inhibit drive pulse from the previous comparison is sufficiently delayed as to occur simultaneously with the production of a timing pulse from the second timing unit 14. Consequently, if during the previous comparison step the input voltage on line 10 exceeded the voltage level on line 24, an inhibit pulse is produced by unit 74 and directed over line 81 to the gate 80 simultaneously with the pulse from timing unit 14 being injected into the gate 80 over line 76. Since both pulses are received simultaneously, the gate 80 does not transmit an output pulse over line 82 to reset the switch control unit 62, and consequently the main switch 64 in the highest order remains energized to maintain the resistor 25 energized.

Thus, upon the initiation of the second comparison step in response to the operation of the second timing unit 14, the first switch control unit 62 is reset to remove the potential energizing the highest order resistor 25 only in the event that the previous voltage level signal on line 24 exceeded the input signal on line 10 whereas if during the first comparison, the input signal 10 exceeded the signal level on line 24, an inhibit drive pulse is generated coincidentally with the next timing pulse drive to prevent resetting of the switch control whereby the resistor 25 remains energized as is desired.

As thus far described, the system operates to first compare the highest order or digit of the binary number to the voltage input on line 10 and produce an output pulse at the inhibit drive 74 only in the event that the first voltage level on line 24 is less than the input voltage on line 10. During the second comparison, an additional incremental voltage is added to line 24, which increment is proportional to the second highest order of the binary number to be determined. At the time of the addition of a second voltage level increment to line 24, the first voltage level on line 24 is either removed from the line 24 or remains on line 24 depending upon whether during the first comparison step, this voltage level exceeded the input voltage. If the voltage level on 24 exceeded the input voltage on 10, an inhibit pulse is not produced and the timing pulse over line 76 from the second timing unit 14 is transmitted to reset the switch control 62 and disable the main switch 64, thereby removing the first voltage level from the line 24. On the other hand, if the voltage level on 24 is less than on line 10, an inhibit pulse is produced and both the first and second voltage increments are added on line 24.

In a similar manner, this comparison process is repeated for a total of ten comparisons (assuming that the system involves ten binary orders), and during these ten operations, voltage increments are added or removed from the line 24 until the ultimate potential on line 24 closely approximates or is equal to the input voltage 10. At the end of the comparison steps, certain ones of the resistors 25 to 34, inclusive, are energized corresponding to those orders of the unknown binary number that are contained in the input signal on 10 and others of the resistors 25 to 34, inclusive, are not energized if those orders of the binary number are not contained in the input signal. Consequently, for simultaneous read-out the binary number conversion of the analog input signal is determined by noting which ones of those resistors 25 to 34 are energized after the completion of the comparison operations.

For sequentially reading-out the binary number, an output line 35 is connected to the inhibit drive circuit 74 and thereby produces an output pulse during each successive comparison only if the input signal on 10 exceeds the then existing voltage level on line 24. Consequently, the series of output pulses produced over the output line 35 likewise represents the binary number conversion of the input signal over line 10.

Figure 2:
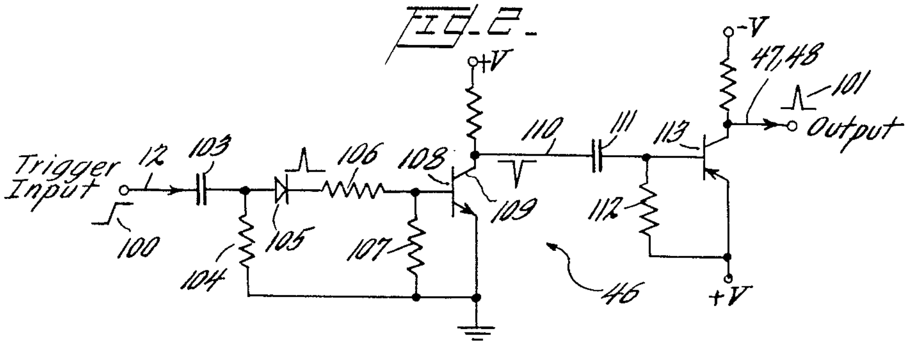

Referring now to FIGS. 2 through 9, inclusive, for a detailed consideration of preferred circuitry employed in the system of FIG. 1, there is shown in FIG. 2 one preferred wave shaping circuit that may be employed as the unit 46 in FIG. 1. As noted above, the purpose of this circuit is to convert a positive going impulse of relatively slow rise time to an amplified trigger spike having a very short time duration and extremely fast rise time that is suitable for triggering the other circuits discussed at precise time intervals. As shown, the input triggering pulse received over line 12 is initially passed through a differentiating circuit comprised of a series capacitor 103 and a resistor 104, to differentiate the input trigger pulse and produce sharp edged positive and negative going portions. The positive going sharp edged portion is permitted to pass through a one-way diode 105 but the negative going portion is blocked from passing therethrough, whereby the positive going sharp edged spike may pass through the resistor network 106 and 107 to energize the base element of an amplifying transistor. The transistor amplifies and reverses the polarity of the pulse, which appears at its collector element, and is transmitted over line 110 and through a second differentiating circuit comprised of a series capacitor 111 and a resistor 112. After being differentiated for the second time, an extremely sharp edged impulse obtained is then directed to the base element 103 of a further amplifying and polarity restoring transistor and the resulting pulse, shaped as is desired, is then taken from the collector element of the latter transistor and transmitted over lines 47 and 48 as shown in FIG. 1.

Figure 3:
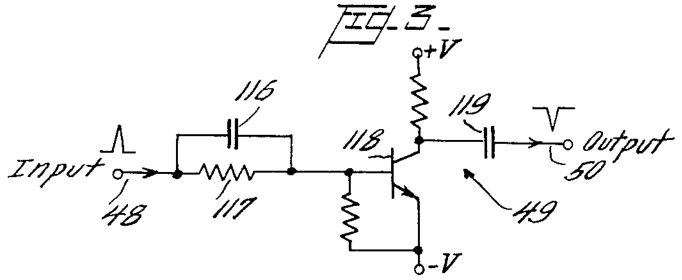

After wave shaping, the pulse is directed over line 48 to the reset drive circuit 49, one preferred form of which is shown in FIG. 3. The reset drive circuit is for the purpose of further amplifying and filtering the trigger pulse and directing this impulse outwardly over line 50 to reset the switch control units, such as 62 and 78 as shown in FIG. 1. Referring to FIG. 3, the input pulse to the reset drive 49 is received over line 48 and directed to a parallel filtering circuit comprised of capacitor 116 and resistor 117 and thence is directed to the base element 118 of an amplifying transistor, which further amplifies the pulse and reverses its polarity so that it is transmitted from the collector element of the transistor and through coupling capacitor 119 to the output reset line 50 as shown.

Figure 4:
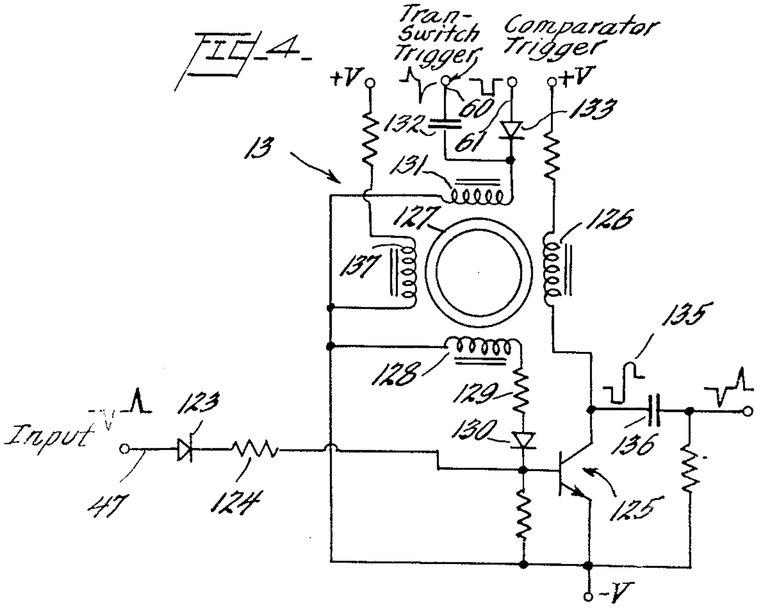

FIG. 4 illustrates one preferred circuit configuration for a single stage of the timing control units, such as the unit 13 shown in FIG. 1. As shown in FIG. 1, eleven such identical stages are required for a binary system of ten orders. As will be recalled, the function of each of the timing control units is to initiate the addition of a different voltage level to the comparator line 24 and to energize the comparator 11 for making the comparison step. Additionally, each of the timing units is adapted to trigger the next succeeding timing unit in the chain after the completion of its operation, whereby each of the timing units is successively triggered in sequence in an automatic manner. Referring to FIG. 4, the wave shaped input pulse over line 47 is first directed through a diode 123 to eliminate any spurious negative going portions and thence is transmitted through a resistor 24 to the base element of a switching transistor 125. The emitter and collector elements of the switching transistor 125 are connected in series with a winding 126 provided on a saturable magnetic core 127 having substantially square hysteresis loop characteristics. Upon receiving the input pulse, the transistor 125 draws current through the winding 126 which thereupon induces a voltage in a second feedback winding 128 on the core 127 in such direction as to feed back a positive going pulse through resistor 129 and diode 130 to the base electrode of the switching transistor. The result of this feedback arrangement is that the saturable core 127 is progressively brought into a fully saturated condition very rapidly thereby producing a short duration output pulse in an output winding 131 on the core. This output pulse is thence directed through a differentiating capacitor 132 to produce a steep sided triggering impulse over output line 60 and is also directed though a diode 133 to produce a substantially square shaped negative going impulse over line 61 leading to the "or" circuit 66 and ultimately to the comparator circuit 11, as shown in FIG. 1. After the above mentioned pulses have been produced and the saturable core 127 is fully saturated, the feedback voltage induced in winding 28 is removed and the transistor 125 is de-energized whereby current flow from its emitter to collector electrodes is cut off. This immediately raises the voltage potential at the collector electrode thereof to produce a positive going impulse portion as indicated at wave form 135. This positive going portion occurs after the negative going portions which have been transmitted over output line 60 and 61 and consequently signifies that this timing unit has completed its operation. Consequently, this positive going portion is differentiated by a capacitor 136 and transmitted to the next stage 14 of the timing unit to trigger the next stage into operation automatically as is desired. Each of these timing control units, such as 13 to 23 also resets itself after each operation by means of a resetting coil 137, also wound about core 127, and energized by a fixed voltage source (not shown) in the opposite direction to reverse the state of saturation of the core 127 and reset it to its initial condition.

Figure 5:
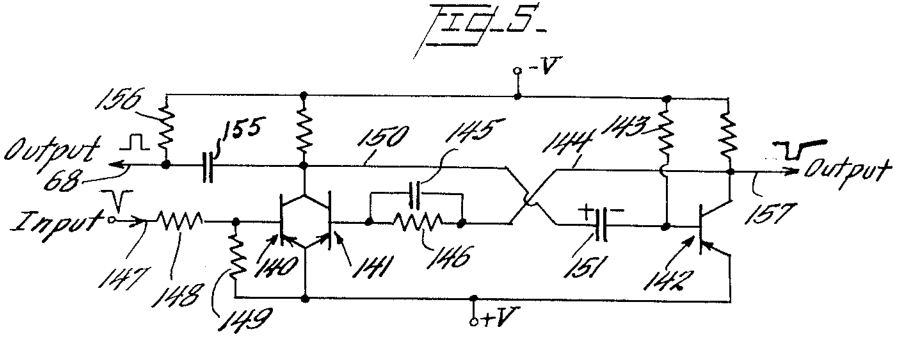

FIG. 5 illustrates a preferred circuit that may be used to perform the functions of the delay circuit 67, the comparator drive circuit 69, the second delay circuit 71, the gate drive circuit 72, and the inhibit drive circuit 74. Although each of these circuits performs a somewhat differing function, the circuit shown in FIG. 5 may be employed in various manners to provide each of these functions. Referring to FIG. 5, the circuit comprises a resistance-capacity coupled one-shot multivibrator that is driven by a transistor to produce constant wave shaped impulses responsively to each input impulse. Specifically, a transistor 140 having base emitter and collector electrodes, receives the input pulse at its base electrode and drives a pair of transistors 141 and 142 that are connected in feedback relationship to reverse the stability state of the latter resistors for a period of time whereupon the circuit then automatically is restored to its initial stability condition. In operation, the transistor 142 is provided with a resistance 143 connecting its base electrode to the negative source of potential and consequently this transistor 142 is normally conducting current between its collector and emitter electrodes. The collector electrode of transistor 142 is connected in feedback over line 144 and through the direct current coupling capacitor 145 and resistor 146 to the base electrode of transistor 141 and consequently normally maintains the transistor 141 nonconducting. Upon receiving an input impulse over line 147 and passing through resistors 148 and 149, the driving transistor 140 is rendered conducting from its collector to its emitter electrodes thereby raising the potential at the collector electrode thereof. This increased potential is transmitted in feedback over line 150 and transiently through capacitor 151, cutting off conduction through transistor 142. As the current conduction through transistor 142 is cut off, the potential at the collector electrode thereof drops and this lower potential is transmitted backwardly in regenerative fashion over line 144 to the base electrode of transistor 141 thereby rendering transistor 141 conducting and raising the potential at the collector electrode thereof. This increased potential is likewise fed back over line 150 and through capacitor 151 to the base electrode of transistor 142. In this fashion, the transistor 142 is rendered nonconducting and the transistor 141 fully conducting. After a period of time sufficient to charge capacitor 151, the base electrode of transistor 142 is restored to the potential of its collector element thereby again rendering transistor 142 conducting. The increased potential is again fed back over line 44 to transistor 141 and the net effect is that the one-shot multivibrator is again restored to its initial condition with transistor 142 conducting and transistor 141 not conducting.

For employng this circuit to produce a time delay, as in circuits 67 and 71 in FIG. 1, the output pulses may be taken from line 68 connected to the collector electrodes of transistors 140 and transistor 141 and passed through a differentiating circuit comprised of a capacitor 155 and resistor 156. At the beginning of the output impulse, the differentiating circuit produces a positive going trigger pulse and at the end of the constant wave shape multivibrator signal there is produced a negative going trigger pulse that is time delayed from the positive pulse by the pulse width of the multivibrator pulse. This negative going trigger pulse is employed to provide the time delayed impulse feeding the comparator drive circuit 69 in FIG. 1 or the gate circuit drive 72 in FIG. 1.

For employing this circuit of FIG. 5 as the comparator drive circuit 69 or the gate circuit drive 72, the output impulse may be taken from line 157 leading from the collector electrode of transistor 142. As shown, this latter output impulse is of the negative going variety having a constant wave form as is desired for operating the comparator circuit 11.

Figure 6:
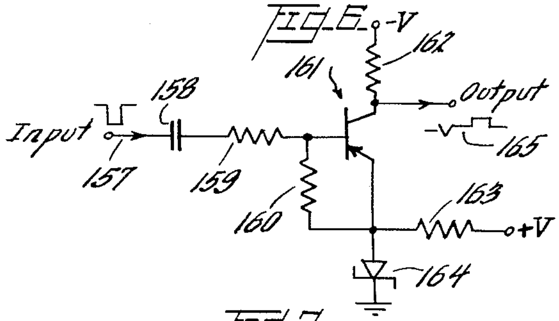
Figure 7:
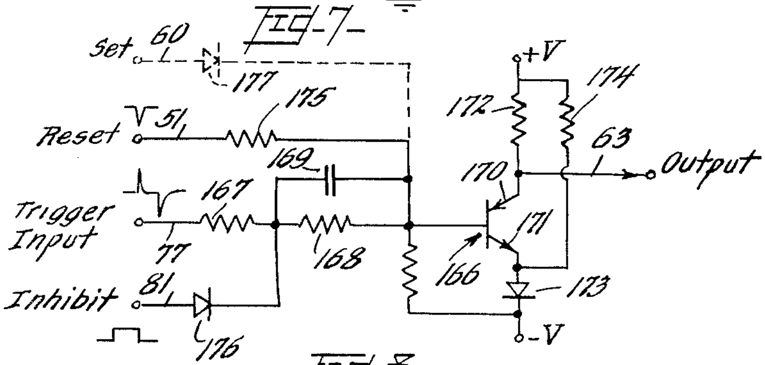
Figure 8:
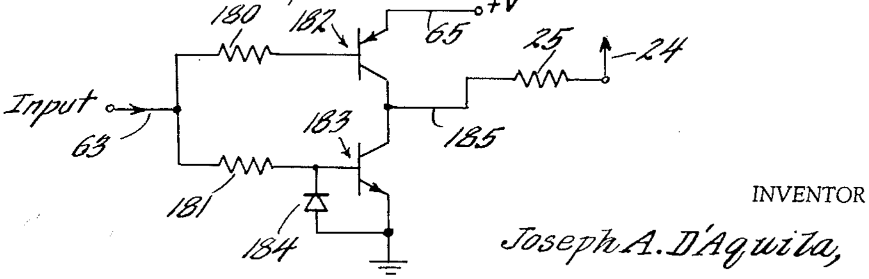

For the inhibit drive circuit 74, it is also preferred to employ a circuit as in FIG. 5 feeding with the further circuit of FIG. 6. FIG. 7 illustrates a preferred circuit for the switch control units 62, 78, and the other remaining eight similar circuits as shown in FIG. 1. As will be recalled, the function of the switch control is to turn on and off the main switches such as 64 and 79 responsively to impulses over the set and reset lines thereby controlling application of the reference voltage supply to the resistors 25 to 34, inclusive. As shown, the switch control preferably employs a control silicon switch 166 that, as is known, functions somewhat in the manner of a thyratron in responding to a positive going impulse at its base or control electrode to pass a relatively large current through its remaining two electrodes, and to continue in this state of current conduction after the input or triggering pulse is removed until the unit receives a negative going or off pulse at its control electrode which serves to greatly increase the impedance between its two power electrodes and prevent current flow therethrough. Control switches of this solid state variety are available on the open market and sold by one manufacturer supplying such switches under the name "Transwitch." As shown, the switch control circuit is triggered into operation by the application of a set impulse over line 77 that passes through a limiting resistor 167 and a resistor capacitor network 168 and 169 leading to the control electrode of the "Transwitch" 166. This positive going impulse, reduces the impedance presented between the two main electrodes 170 and 171 greatly lowering the impedance thereof and permitting current flow from a positive source and through a resistor 172 and diode 173 to a negative going source. As a result, the voltage on the output line, such as 63, drops from the potential of the source to a lower potential due to the voltage drop across resistor 172. Thereafter, the control switch 166 continues to conduct after the triggering impulse on line 77 has expired due to the characteristics of the control switch and thereby provides a continuing lower level output signal on line 63 as is desired. When it is desired to reset the switch, a negative going reset pulse is directed over line 51 and through a current-limiting resistor 175 to the control electrode of the switch 166, greatly increasing the impedance between its main electrodes 170 and 171 and preventing further current flow therethrough. Once the impedance between these electrodes has been increased in this manner, the switch 166 remains nonconducting and the output voltage on line 63 is again raised to the potential of the energizing source.

As will be recalled, it is desired to nullify the effect of a reset pulse by the inhibit drive 74 (FIG. 1) and prevent resetting of the control switch 166 under certain circumstances. This inhibit control is provided by supplying a positive going inhibit pulse over line 81 and through diode 176 and capacitor 169 and resistor 168 coincidentally, with the transmission of the negative going reset pulse over line 51. If a reset pulse over line 51 is received at the same time as a positive inhibit pulse over line 81, then the potential reaching the control electrode of control switch 166 is unchanged and the control switch 166 is unaffected by the reset pulse.

All of the control switches shown in FIG. 1 may be of the configuration shown in FIG. 7 with the exception of the first control switch 62 whose connections in the system are somewhat different. In the first control switch circuit 62, the reset line 51 and resistor 175 may be replaced by a set line shown in dotted form as 60 together with a series connected diode 177. The operation, however, is otherwise the same as in the other control switch circuits.

The output of these control switch circuits are fed to the main switching circuits such as 64 and 79 in FIG. 1, which in turn function essentially as single pole double throw switches serving to connect a resistor to either the positive reference voltage 65 or to ground depending upon whether it is desired to energize that resistor in the circuit.

Figure 9:
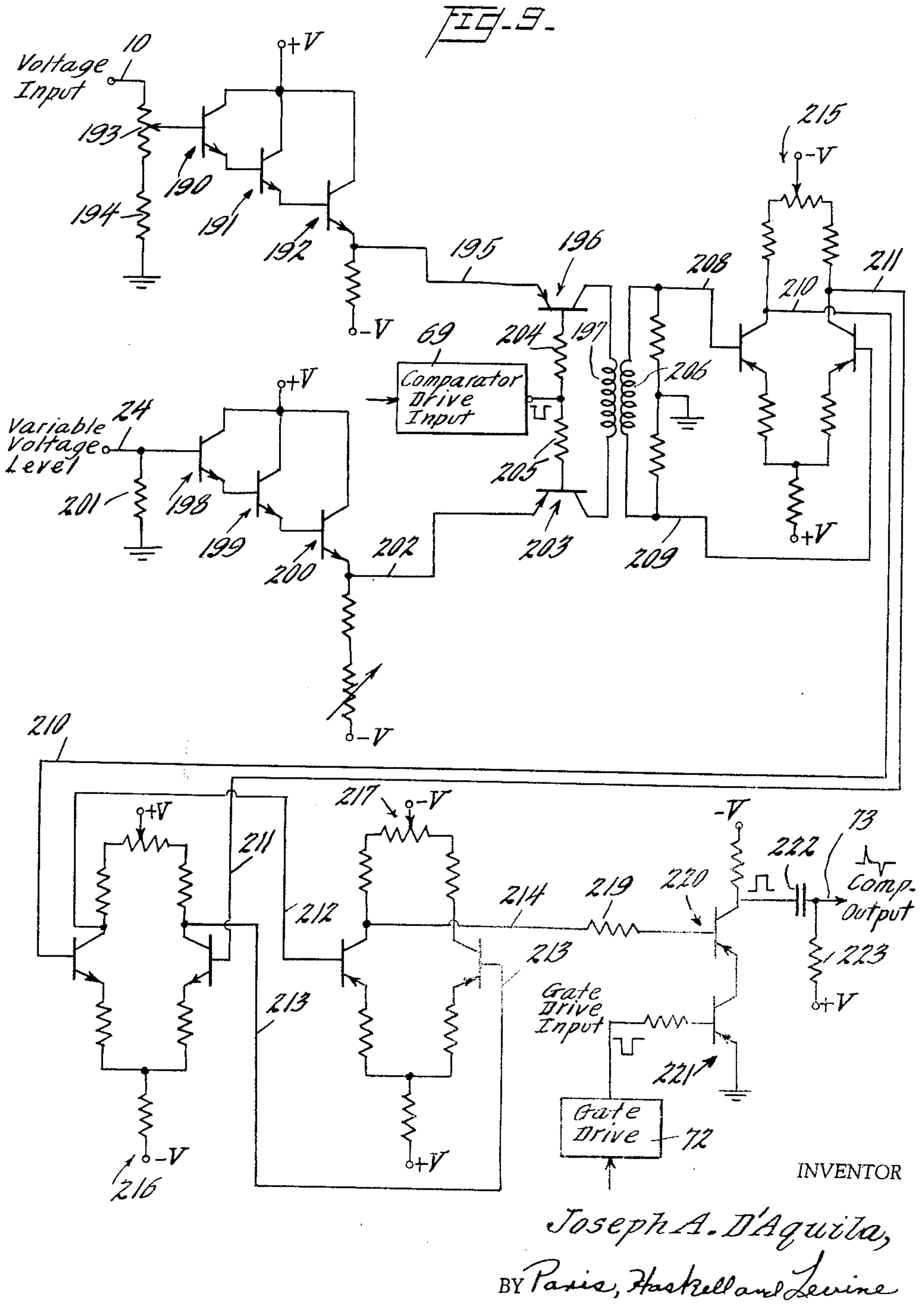

One preferred circuit for the comparator 11 is shown in FIG. 9. As will be recalled, the comparator functions to compare the amplitude of the voltage input or intelligence signal on line 10 with the various voltage levels on line 24 and produce an output impulse over line 73 to the inhibit drive circuit 74 when the input signal voltage on line 10 exceeds the voltage level on line 24 but not to produce an output voltage signal on line 73 if the voltage level on line 24 exceeds the input signal. As shown in FIG. 9, the input voltage signal on line 10 is first directed to a series of emitter follower connected transistors 190, 191, and 192 through an input resistor network comprising potentiometer 193 and resistor 194. From the output of the emitter followers, the signal is directed over line 195 and in series with the emitter-collector electrodes of a first transistor switch 196 to one side of the primary winding 197 of a comparator transformer. The voltage level on line 24 is likewise directed through a series of emitter follower connected transistors 198, 199, and 200, for impedance matching purposes, and the output thereof over line 202 is directed through a second switching transistor 203 to the other side of the primary winding 197 of the comparator transformer. The switching transistors 196 and 203 have their base electrodes commonly connected through resistors 204 and 205 to the comparator drive circuit 69, and consequently when the comparator drive 69 produces an impulse, both switching transistors 196 and 203 are renedered conducting from their emitter to their collector electrodes to differentially apply the voltage input on line 10 and the voltage level on line 24 at opposite terminals of the primary winding 197 of the comparator transformer. In this manner, the resulting polarity of the potential across the primary winding 197 is in one given direction if the voltage input 10 exceeds the voltage level 24, and is of the opposite polarity if the voltage level on 24 exceeds the voltage input on line 10. The secondary winding of comparator transformer 197 likewise produces a reversible polarity signal on lines 208 and 209 depending upon whether or not the voltage level on line 24 exceeds or is less than the input voltage on line 10. This secondary winding signal produced on lines 208 and 209 is then amplified by three stages of differentially connected transistors generally designated 215, 216, and 217, and the output of the third stage being directed over line 214 possesses a more positive potential when the voltage level on line 24 exceeds that of the input signal on line 10 and a more negative potential where the input voltage on line 10 exceeds the voltage level on line 24. Thus, upon receiving a drive impulse from the comparator drive input 69, a comparison is made between the intelligence signal input on line 10 and the voltage level on line 24 to produce a more positive voltage on line 214 in the event that the input signal on line 10 is less than the voltage level on 24 or alternatively a more negative potential on line 214 if the input signal on line 10 is greater than the voltage level signal on line 24.

The voltage signal on line 214 is then directed to a gate circuit comprised of a pair of transistors 220 and 221 that responds only to the more negative potential on line 214 to produce an output signal over line 73 and leading to the inhibit drive circuit 74 (see FIG. 1) at the time instant when the gate drive circuit 72 is energized. More specifically, the voltage signal on line 214 is directed through a resistor 219 to the base electrode of a first gate transistor 220 whose emitter and collector electrodes are connected in series with the emitter in collector electrodes of a second gate transistor 221. The base electrode of the second gate transistor 221 is adapted to be energized by an impulse from the gate drive circuit 72 whereby when both gate transistors 220 and 221 are simultaneously energized by impulses of the proper polarity, both transistors are rendered conducting and a positive going output pulse is directed from the collector electrode of transistor 220 and through coupling capacitor 222 and resistor 223 to the line 73 leading to the inhibit drive 74. Both transistors 220 and 221 are of the variety that are rendered conducting by negative going impulse and consequently when the voltage signal on line 214 is more negative, the upper gate transistor 220 is rendered conducting. Similarly, the lower transistor 221 is energized by negative impulse from the gate drive circuit 72 after a short time delay, as discussed above, rendering the latter transistor conducting and transmitting the comparator output pulse over line 73.

Returning to FIG. 1, the various voltage increments being produced on line 24 and leading to the comparator 11, each correspond to a voltage proportional to a different order or digit of the binary system and therefore this portion of the system may be likened to a digital to analog converter wherein as different ones of the main switches 64 and 79 are energized, the voltage increments added to the line 24 correspond to the analog equivalent of that digital order. For obtaining this variable voltage increment desired, each of the resistors 24 to 34, inclusive, have values corresponding to that order of the digital number. For example, the first resistor 25 is made to be one-half of the second resistor 26; and the third resistor 27 is, in turn, twice as large as the second resistor 26 and four times as large as the first resistor 25. The fourth resistor 28 is likewise twice as large as the third resistor 27 or eight times as large as the first resistor 25. As discussed above and shown in connection with the main switching circuits such as 64 and 79, each of these resistors is sequentially adapted to be connected to a fixed voltage reference source whereby as each such resistance is connected to the voltage reference line 65, a smaller increment of voltage, corresponding to that lower order of the binary number, is applied to the comparator line 24. Thus, the comparator line 24 is adapted to be successively energized by gradually increasing increments corresponding to the lesser orders in the binary system as is desired.

It is believed evident that if it is desired to convert the intelligence input signal on line 10 into a digital number represented in other than the binary system, the resistors 25 to 34 may be replaced by a different series of weighted resistors whose relationship with one another would correspond to the different orders of the other digital number system chosen. Consequently the system of the present invention may convert the analog input signal into a digital number represented in any of the known radix systems.

Although but one preferred embodiment of the invention has been illustrated and described, it is believed evident that many changes in the system and in the individual preferred circuits may be made by those skilled in the art without departing from the spirit and scope of the invention. Consequently, this invention is to be considered as being limited only according to the following claims appended hereto.

What is claimed is:

1. In an analog to digital converter, a comparator energized by the analog signal to be converted and by a variable voltage level input, means for producing a fixed level voltage corresponding to each order of the digital number to be found and additively coupling each of said voltages in time sequence to said input from the highest order to the lowest order, means including said comparator for sequentially comparing said additive voltage at the input with the analog signal after each fixed level voltage has been added and for removing the previously added fixed level voltage from the input in the event that the voltage level at said input exceeds the analog signal, said last mentioned means including time delay means for delaying each comparison of said fixed level voltages with said analog voltage until a time period after each fixed level voltage is produced, and means for reading out the various orders of said digital number contained in said analog signal.

2. In a cyclically operating analog to digital converter, a plurality of impedances, one for each order of the digital number, and each having a value corresponding to a different exponential power of the radix of the digital number, coupling means for commonly connecting one terminal of each impedance to a common line, timing means for successively energizing another terminal of each impedance only once with the same reference voltage during each cycle of operation of the converter, thereby to successively add signal increments on the line corresponding to the different orders of the digital number, means for comparing the signal on said line with an analog input signal after each increment is added thereto and selectively removing that increment at the time that the next increment is being added in the event that the signal on the line before adding the next increment exceeds the analog input signal, and means for reading out the digital number.

3. In the converter of claim 2, said comparing means comprising a differentially energizable circuit having opposite terminals energizable by said analog input signal and the signal on said line, respectively, a transistor switch in circuit with each of said opposite terminals, means for simultaneously rendering both said transistor switches conductive to apply said analog input signal and the signal on said line to said opposite terminals, said differentially energizable circuit having an output producing a comparison signal of opposite polarity depending upon whether said analog signal is less than or greater than the signal on said line, and a gate circuit energizable in response to a triggering impulse received simultaneously with an output signal of one given polarity from said differentially energizable circuit to transmit an output signal from said gate.

4. In the converter of claim 2, said means for comparing the signal on said line with an analog input signal after each increment is added thereto including a timing means for initiating each comparison, a first delay means responsive to said timing means, a drive means being energized in time delayed relation by said delay means to condition said comparing means, a second time delay means energized by said first time delay means and a second drive means energized by said second time delay means in timed delayed relation to said first timing means to energize said comparing means to produce an output signal in the event of a given amplitude relationship between the analog signal and the signal on said line.

5. In the converter of claim 4, each of said time delay means and drive means comprising a one shot multivibrator having a pair of transistors in feedback relationship, with one transistor normally biased into conduction and the other cutoff and energizing means including a third transistor for initiating a reversal of the conducting condition of the pair of transistors for a given time interval.

6. An analog to digital converter comprising: a signal level comparator for receiving a varying amplitude input signal, a plurality of different amplitude signal generators being interconnected for applying their signals additively to said comparator, a timing means for energizing each of said signal generators in sequence, and time delay means coupling said timing means and comparator to enable comparison of said input signal and said additive different amplitude signals after passage of a given time delay following the energization of each said signal generator.

7. An analog to digital converter comprising: a plurality of different amplitude signal generators for additively producing different fixed amplitude signals, cyclically operating timing means triggering each of said generators into operation in sequence, means interconnecting said generators in pairs, whereby when each said generator is triggered into operation by said timing means, the immediately preceding generator is normally deenergized, a comparator and time delay synchronizing means responsive upon the triggering of each said generator to prevent the normal deenergization of the preceding generator in the event that the difference between an incoming signal and the preceding additive signal from said generators is of a given polarity.

References Cited by the Examiner

UNITED STATES PATENTS

| | | | |
|---|---|---|---|
| 2,869,115 | 1/59 | Doeleman | 340—347 |
| 2,947,971 | 8/60 | Glauberman | 340—172.5 |
| 3,051,901 | 8/62 | Yaeger | 340—347 |

MALCOLM A. MORRISON, *Primary Examiner.*

STEPHEN W. CAPELLI, *Examiner.*